United States Patent [19]

Feuerherm

[11] 4,120,633

[45] Oct. 17, 1978

[54] EXTRUSION PRESS HEAD FOR THE EXTRUSION OF TUBULAR STRANDS OF PLASTIC MATERIAL

[76] Inventor: Harald Feuerherm, Alfred-Delp-Str. 1, 5210 Troisdorf, Fed. Rep. of Germany

[21] Appl. No.: 804,378

[22] Filed: Jun. 7, 1977

[30] Foreign Application Priority Data

Jun. 9, 1976 [DE] Fed. Rep. of Germany ....... 2625786
Sep. 3, 1976 [DE] Fed. Rep. of Germany ....... 2639665

[51] Int. Cl.² ............................................ B29D 23/04
[52] U.S. Cl. ................................. 425/462; 264/209; 425/133.1; 425/380; 425/467
[58] Field of Search .................... 72/264, 265, 273; 264/209; 425/462, 190, 192 R, 380, 381, 466, 467, 532, 133.1, 463

[56] References Cited

U.S. PATENT DOCUMENTS

| 3,386,132 | 6/1968 | Fischer | 425/381 |
| 3,985,490 | 10/1976 | Kader | 425/466 X |
| 4,038,017 | 7/1977 | Langecker | 425/466 |
| 4,059,373 | 11/1977 | Maier | 425/467 X |

Primary Examiner—Francis S. Husar
Assistant Examiner—Mark Rosenbaum
Attorney, Agent, or Firm—Michael J. Striker

[57] ABSTRACT

An extrusion press head for the extrusion of tubular strands of plastic material includes an outer housing and a stationary mandrel extending coaxially through the outer housing to form with the latter an annular space in which an annular piston is reciprocable. The material to be extruded is fed into the annular space through at least one feed channel which communicates with the annular space through an annular outlet and extending in axial direction of the mandrel.

19 Claims, 22 Drawing Figures

EXTRUSION PRESS HEAD FOR THE EXTRUSION OF TUBULAR STRANDS OF PLASTIC MATERIAL

BACKGROUND OF THE INVENTION

The present invention relates to an extrusion press head for the production of tubular strands of thermoplastic material which includes an annular space for the material to be extruded which is delimited at the outer circumference thereof by a housing and at the inner circumference thereof by a mandrel concentric with the housing. The extrusion press head further includes an annular piston axially movable in the annular space and at least one feed channel for feeding the material to be extruded into the annular space below the piston, which feed channel communicates with the annular space through an annular outlet end.

In a known extrusion press head of the above-mentioned kind there are provided two hollow cylindrical outlet ends for the feed channels which are separated only by thin bushings from each other and which terminate at the same side of the annular piston into a channel (DT-OS No. 2,100,192).

An extrusion press head is further known, with a single hollow cylindrical outlet end of the feed channel communicating with the aforementioned annular space. In this construction there are provided several webs between the mandrel and the housing for securing the mandrel to the housing, in which the webs are connected by an annular member with each other, and arranged circumferentially displaced from each other at two different diameters (German magazine "Kunstoff 66", year 1976, pages 15–17).

In these two known extrusion press heads there occurs often a disadvantageous relative movement between the streams of plastic material emanating from the two outlet ends. In order to avoid imperfections in the product to be formed, equal speeds of the two individual streams of material, formed in the feed channels, are necessary. The higher the speed of the material in the channels will be, the more difficult it will be to synchronize the flow resistance in the channels correspondingly.

In a further extrusion press head as disclosed in DT-Gbm No. 71 46 597, the material plasticized by an extruder is fed laterally toward the annular piston, whereby the latter, in the region where the outlet end of the extruder extends through the aforementioned housing, has a cutout in form of a pocket which in any position of the annular piston has to communicate with the outlet end of the extruder. The plastic material passing through the pocket will remain in part longer in the annular piston than the other plastic material fed from the extruder. This will result that the period of dwell of the material in the annular space and that of the material pushed out by the annular piston will be different and that the material which is fed first by the extruder into the extrusion press head will not leave the latter also ahead of the other material.

SUMMARY OF THE INVENTION

It is an object of the present invention to provide an extrusion press head in which the leading end of the material fed over a feed channel through the annular piston into the extrusion press head, forms also the leading end which is extruded from the latter.

It is a further object of the present invention to provide an extrusion press head which is composed of relatively simple and sturdy parts, so that the extrusion press head will stand up properly under extended use.

With these and other objects in view, which will become apparent as the description proceeds, the extrusion press head according to the present invention, for the extrusion of a tubular strand of plastic material, mainly comprises an outer housing, a mandrel extending coaxially through the outer housing and defining therewith an annular space, an annular piston axially movable in the aforementioned annular space, and at least one feed channel for plasticized material, in which the feed channel has an annular outlet end communicating with the annular space below the piston and in which the annular outlet end has an inner diameter which is greater than the inner diameter of the annular piston, so that at least part of the annular piston is located between the outlet end and the mandrel.

An especially advantageous construction according to the present invention is derived if two or more feed channels are provided, and in which the diameters of the annular outlet ends are constructed such that at least part of the annular piston is located between the outlet ends so as to separate the streams of plasticized material, flowing through the feed channels into the annular space, from each other. This will result in the advantage that the material streams emanating from the annular outlet ends of the feed channels will have a very small relative movement with respect to each other. Due to the separation of the partial streams up to the annular space, the partial streams are fed individually into the annular space, whereby the speed of the individual streams at the junction thereof is very small so that striations or markings in the finished product are substantially avoided. It is for instance possible to feed into the annular space two partial streams of different colors or of different materials, without practically any intermixing of the two partial streams of different colors or of different materials taking place. The extrusion press head is also in this advantageous construction formed in a space saving and stable manner.

A further advantageous construction according to the present invention will result, if the outlet end of one of the feed channels has an inner diameter which is equal to the outer diameter of the annular piston and that the annular piston separates the two partial streams of the material from each other. In this way material pockets are essentially avoided, so that after a short time new material fed into the annular space will not be soiled by old material therein. In this way it is possible, during the operation of the extrusion press head, to treat materials of different colors or of different characteristics shortly after each other, without resulting in a long intermediate time in which the two materials will mix with each other.

Further advantageous constructions according to the present invention permit to feed the material through more than two feed channels, which up to the annular material receiving space, are separated from each other.

In a further advantageous construction according to the present invention one or more feed channels extend in the region of the annular piston parallel to the axis thereof and a telescopic tube extends through each of these feed channels likewise parallel to the axis of the annular piston. The material is fed through the telescopic tubes, with the necessary deflection for forming an annular outlet end, directly into the annular material receiving space, so that no space is provided in which the material could remain stationary. The extrusion press head of this construction is contructed of only few relatively large elements and especially the annular piston can be constructed in one piece. The extrusion press head may therefore be constructed at relatively small cost. In addition, the outer diameter of the extrusion press head can be held relatively small and, due to this small outer diameter, it is possible to considerably reduce the distance between the centers of a plurality of extrusion press heads in large installations.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Parts having the same function are designated in the following description of the various modifications with the same reference numerals, whereby in order to indicate the difference between similar parts a small letter is added to the respective numeral.

Figure 1:
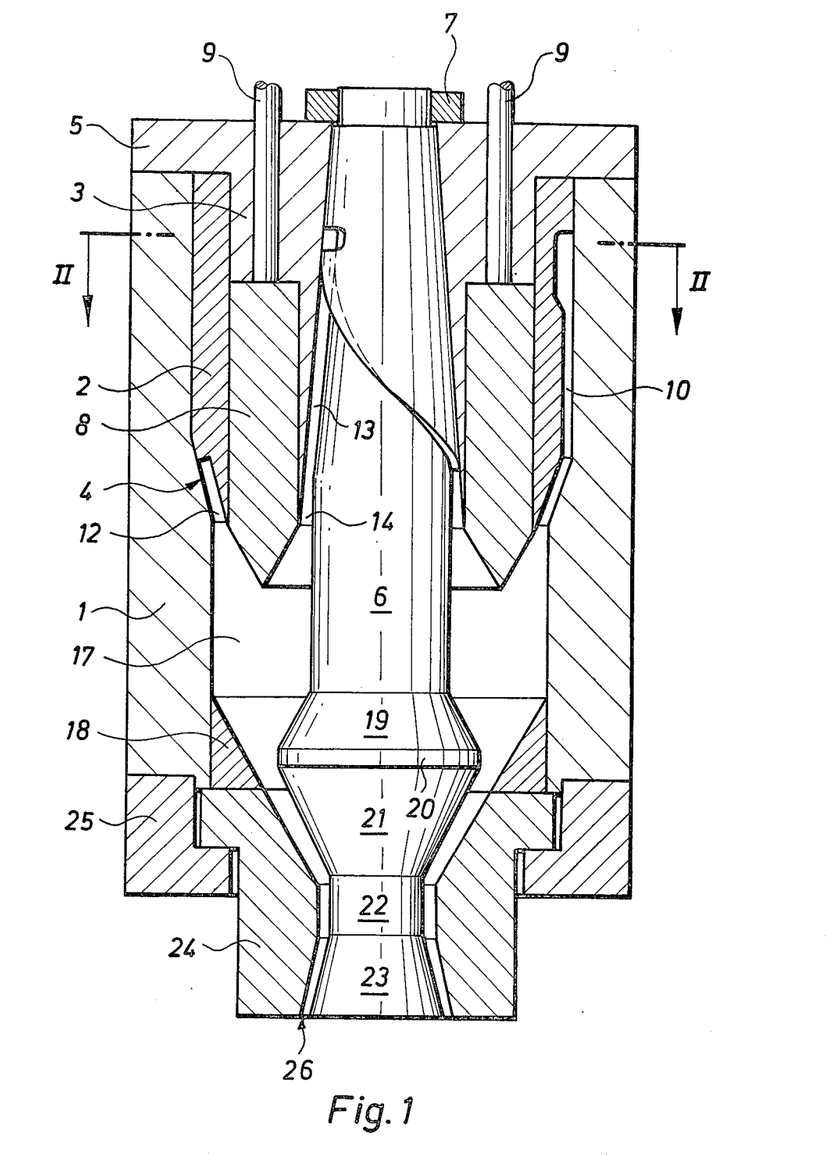
FIG. 1 is an axial cross-section through a first extrusion press head according to the present invention, taken along the line I—I of FIG. 2.
Figure 2:
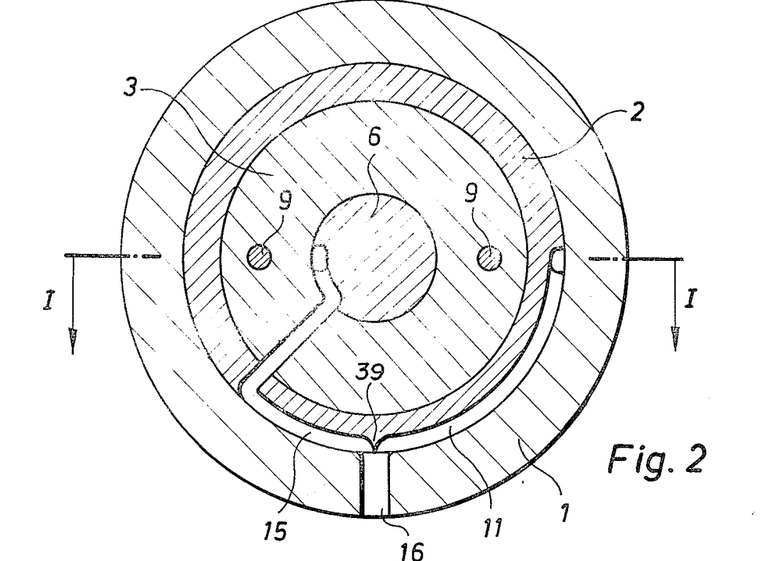
FIG. 2 is a horizontal cross-section, taken along the line II—II of FIG. 1.

The extrusion press head illustrated in FIGS. 1 and 2 has an outer housing 1, in form of a hollow cylinder, in which an outer bushing 2 and an inner bushing 3 are inserted. The outer bushing 2 abuts with a conical face, provided at its lower part thereof, against a corresponding conical inner surface portion 4 of the housing 1. The inner bushing 3 has at its upper end an outwardly extending flange 5, which projects beyond the upper end of the outer bushing 2, and that of the housing 1 and abuts against the upper face of bushing 2 and that of the housing 1. A mandrel 6 extends coaxially through the housing 1 and seats with its conical upper end portion in a corresponding bore of the inner bushing 3 and is held by a nut 7 screwed to the upper threaded end of the mandrel in the bore of the bushing 3. An annular piston 8 is axially movable in the space between the outer bushing 2 and the inner bushing 3. The annular piston 8 is movable in axial direction by a plurality of rods 9 extending through the inner bushing 3, of which only two of the rods 9 are illustrated in FIG. 1. A cardioid-shaped feed channel 10 is provided on the outer surface of the outer bushing 2, which uniformly distributes the plastic material emanating from a distribution channel 11 over the circumference of the outer bushing so that the plastic material emanates in tubular form from the outlet end 12 of the cardioid-shaped feed channel 10.

A cardioid-shaped cutout 13 is also provided at the outer surface of the mandrel 6, which together with a conical inner surface of the inner bushing 3 forms a cardioid-shaped feed channel 13, which has an annular outlet end 14 through which the material passing into the channel 13 through a distribution channel 15 emanates in tubular form. The distribution channels 11 and 15 (FIG. 2) communicate with a radially arranged inlet channel 16, whereby in the region of the communication of the channels 11 and 15 with the inlet channel 16 a wedge-shaped separating projection 39 is provided, which separates the material passing through the inlet channel into two partial streams. The inlet channel 16 is connected to a non-illustrated extruder. The distribution channels 11 and 15 may also be connected to different extruders which extrude differently colored material and/or material of different characteristics. Whereas the channel 11 extends only about a portion of the circumference of the outer bushing 2, the channel 15 is in part formed in the outer bushing 2 and in part in the inner bushing 3.

The annular piston 8 is shown in FIG. 1 in its uppermost position and below the piston 8 in its uppermost position there is provided an annular material receiving space 17 into which the material to be extruded is fed through the feed channels 10 and 13. The space 17 is delimited, on the one hand, by the inner surface of the housing 1 and on the other hand by the outer surface of the mandrel 6. At the bottom end of the space 17, the same is delimited by a limiting member 18 of wedge-shaped cross-section, having an inner surface of frusto-conical configuration and by a conical expansion 19 of the mandrel 6. The conical expansion 19 of the mandrel 6 is followed by a cylindrical intermediate portion 20 and the latter is followed by a conical constriction 21 which, after another cylindrical part 22, is continued again by a conical expansion 23. The upper portion of the conical constriction 21 is located in the region of a lower part of the limiting member 18. The cone angle of the inner surface of the limiting member 18 corresponds to the cone angle of the portion 21 of the mandrel 6. A nozzle member 24 is arranged below the bottom face of the housing 1 and held thereon by an annular member 25, connected in any convenient manner to the bottom face of the housing 1. The inner surface of the nozzle member 24 is constructed in accordance to the outer surface of the portions 21-23 of the mandrel 6, while forming an annular channel between the inner surface of the nozzle member 24 and the parts 21-23 of the mandrel 6, which channel narrows continuously in the direction towards the outlet end 26 of the nozzle member 24.

The annular piston 8 has at its end, facing the limiting member 18, a cross-section in form of an equilateral triangle. The annular piston is movable in downward direction toward the limiting member 18 by means of the rods 9 and in the opposite direction by the material introduced under pressure into the space 17. The triangular cross-section of the lower part of the piston 8 corresponds to the conical inner surface of the limiting member 18 and to the conical outer surface of the portion 19 of the mandrel 6. At the lowermost position of the piston 8, the free space formed between the outer surface of the lower portion of the annular piston, the outer surface of the portion 19 of the mandrel and the inner surface of the limiting member 18 corresponds to the free space which is formed, on the one hand, between the outer surface of the mandrel 6 and the inner surface of the annular piston and, on the other hand, between the outer surface of the annular piston 8 and the inner surface of the housing 1. The material fed in plastic condition under pressure into the space 17 through the outlet ends 12 and 14 of the channels 10 and 13 moves the annular piston in upward direction and during its movement in downward direction the material in the space 17 is extruded through the outlet end 26 of the channel formed between the inner surface of the nozzle member 24 and the outer surfaces of the portions 21-23 of the mandrel 6.

Figure 3:
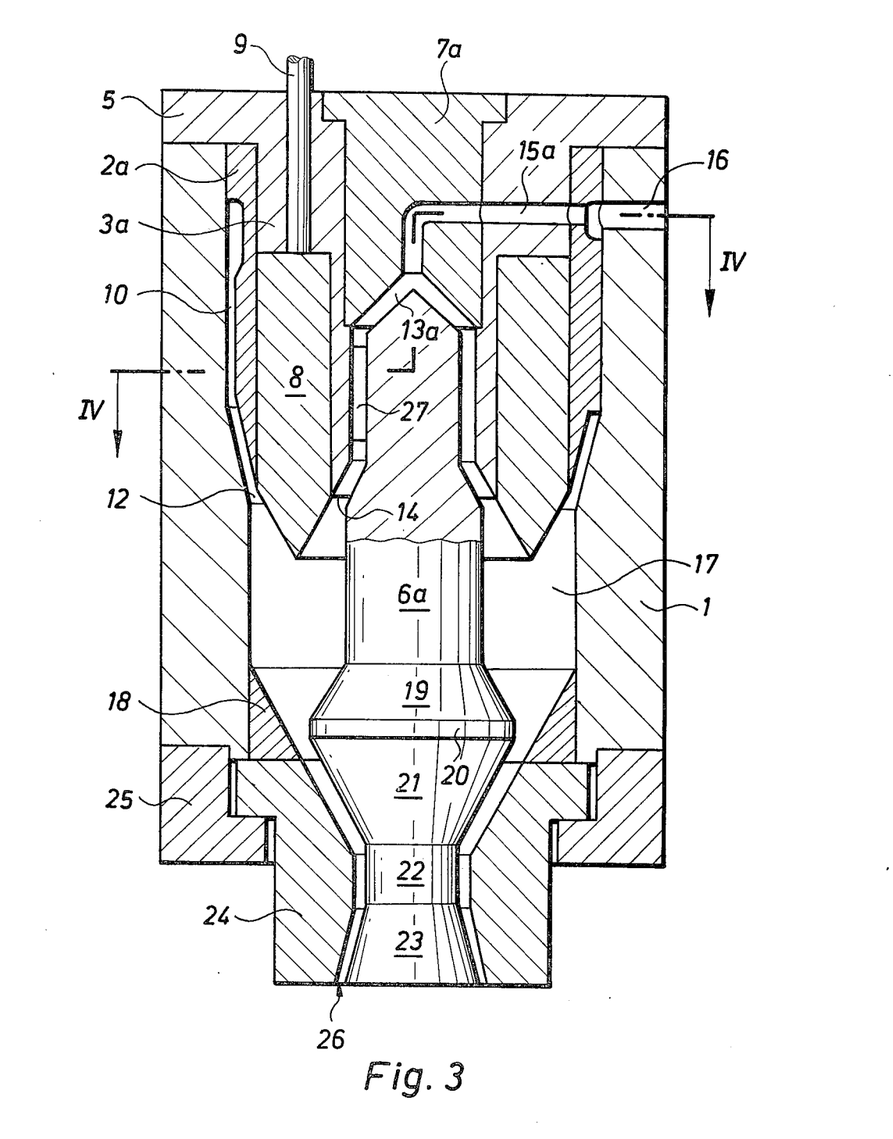
FIG. 3 is an axial cross-section, taken along the line III—III of FIG. 4, through a second embodiment.
Figure 4:
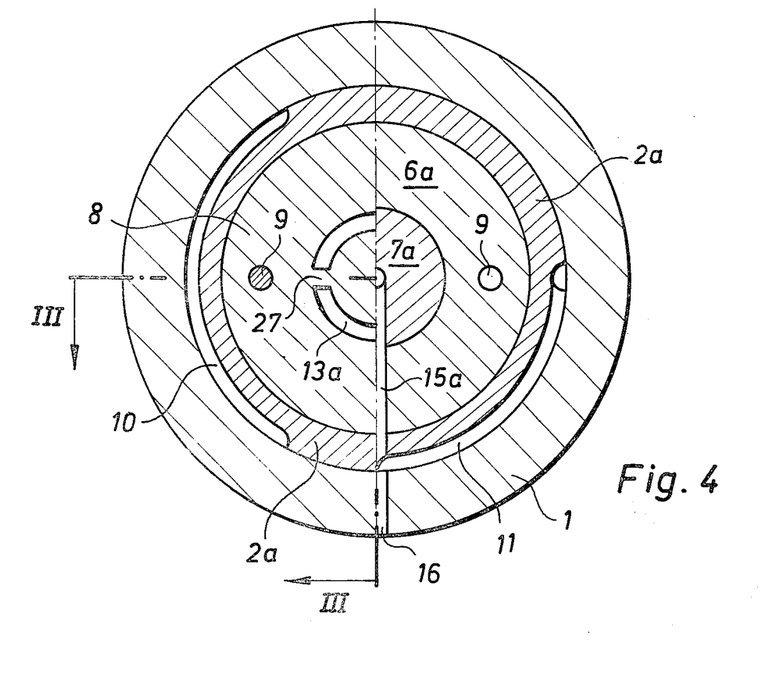
FIG. 4 is a cross-section, taken along the line IV—IV of FIG. 3.

In the second modification, illustrated in FIGS. 3 and 4, the outer bushing 2a is likewise provided at its outer peripheral surface with a cardioid-shaped channel or depression, whereas the inner surface thereof serves as guide face for the annular piston 8. The inner bushing 3a is integrally formed with the mandrel 6a. The mandrel 6a ends short of the flange 5 of the inner bushing 3a and the thus-formed empty space in the latter is filled by a filling member 7a. The inlet channel 16 is continued by a channel 15a through the outer bushing 2a up to the center of the filling member 7a, to extend downwardly in the latter and ends in a conical space, into which a conical portion of the mandrel 6a projects. In this way a channel 13a in form of a hollow cone is formed which is continued by an annular cylindrical channel delimited by the inner surface of the inner bushing 3a and the outer surface of the mandrel 6a, and which ends in a conically enlarged portion having an outlet end 14 in the region of the lower end of the annular piston 8, when the latter is in its uppermost position. The inner bushing 3a and the mandrel 6a are connected to each other by a plurality of webs 27 extending through the annular channel 13a, which webs are circumferentially displaced from each other to let the plastic material pass through the channel 13a.

Figure 5:
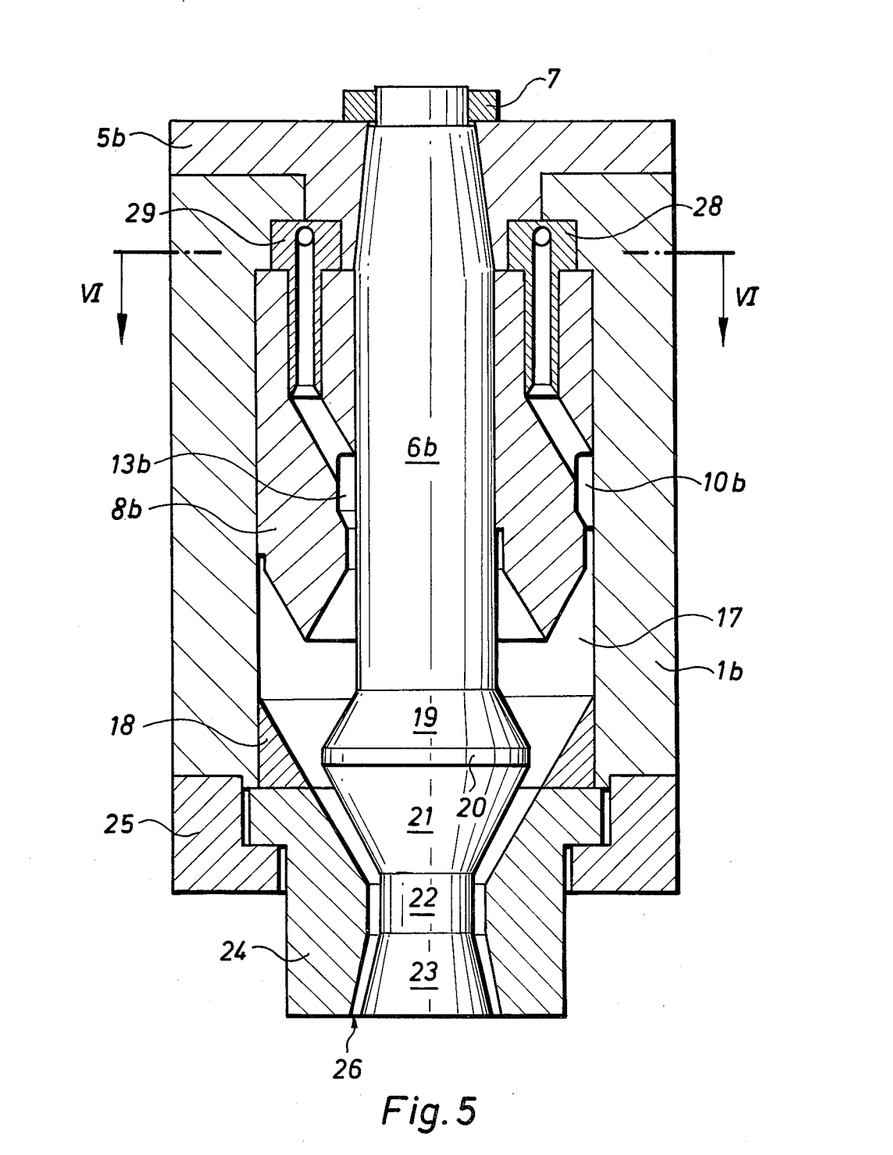
FIG. 5 is an axial cross-section, taken along the line V—V of FIG. 6, of a third embodiment according to the present invention.
Figure 6:
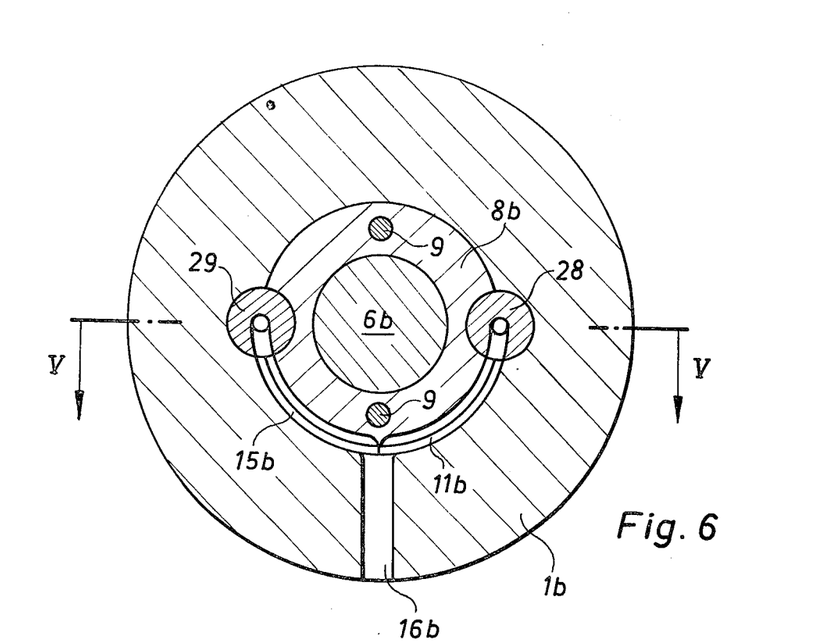
FIG. 6 is a horizontal cross-section, taken along the line VI—VI of FIG. 5.

In the third embodiment, illustrated in FIGS. 5 and 6, the outer peripheral surface of the annular piston 8b engages the inner peripheral surface of the housing 1b, whereas the inner peripheral surface of the annular piston 8b engages the outer peripheral surface of the mandrel 6b, which is the region of the annular piston 8b is cylindrically formed. The annular piston 8b is provided at its outer peripheral surface, as well as its inner peripheral surface, with a cardioid-shaped depression, whereby the depression at the outer peripheral surface of the annular piston 8b forms with the inner peripheral surface of the housing 1b a feed channel 10b and the depression at the inner peripheral surface of the annular piston 8b forms with the outer peripheral surface of the mandrel 6 a feed channel 13b. The feed channel 10b is connected with a telescoping tube 28 and the feed channel 13b with a telescoping tube 29, which telescoping tubes are arranged above the aforementioned channels. The telescoping tubes 28 and 29 extend into corresponding bores formed in the annular piston 8b and are, at their enlarged head portions, held in stationary position between the housing 1b and the bushing 3b. The annular piston 8b moves during its axial movement relative to the telescoping tubes 28 and 29. The bottom portion of the annular piston 8b has likewise a cross-section in form of an isosceles triangle. Distribution channels 11b and 15b (FIG. 6) are symmetrically arranged with respect to an inlet channel 16b and respectively lead to the interior of the telescoping tubes 28 and 29.

It is also possible to connect each of the telescoping tubes 28 and 29 to a separate extruder. For the production of an inner and/or outer layer it is possible to provide also more than one telescoping tube which may be connected to separate extruders. This is especially advantageous for the production of large diameter tubular strands. If the material of one layer is supplied by more than one extruder, then different, for instance materials of different colors may be used. The partial streams forming one of the layers are arranged diametrically opposite each other. If for constructive reasons it is not possible to arrange imaginary lines respectively connecting a pair of partial streams of two pairs of partial streams normal to each other, no detrimental effects are derived from such construction.

Figure 7:
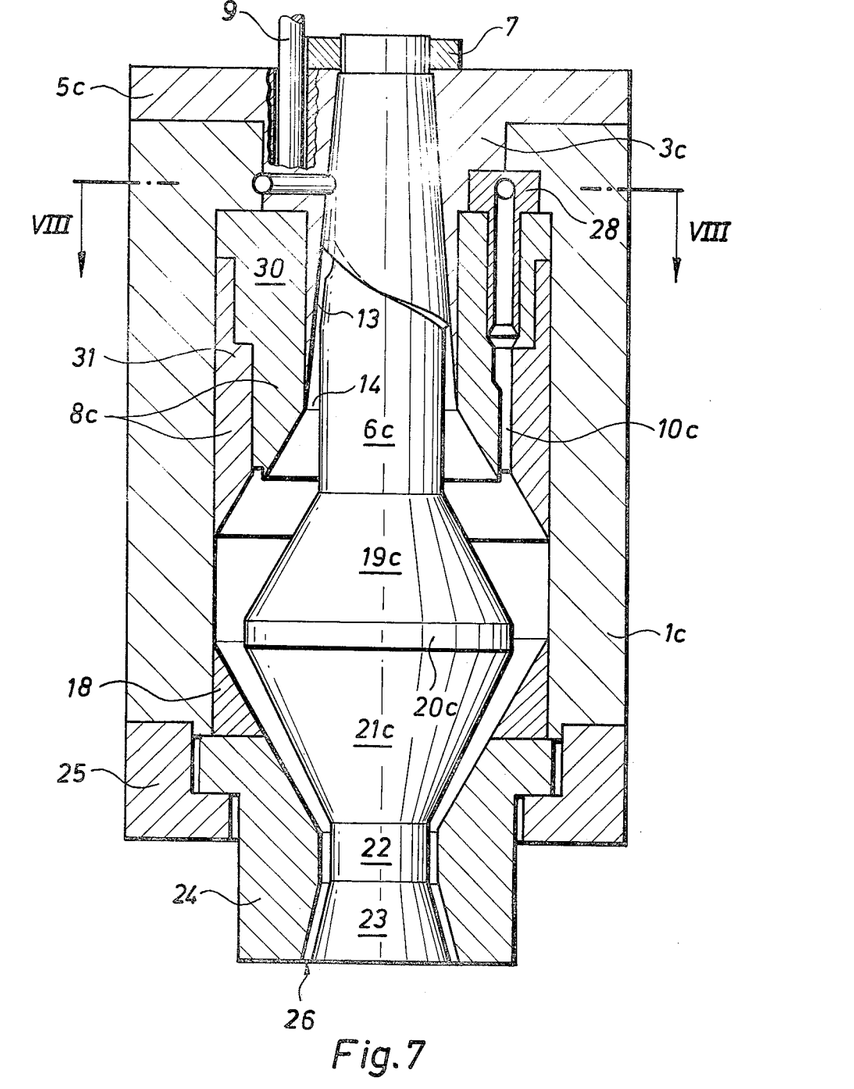
FIG. 7 is an axial cross-section through a fourth embodiment, taken along the line VII—VII of FIG. 8.
Figure 8:
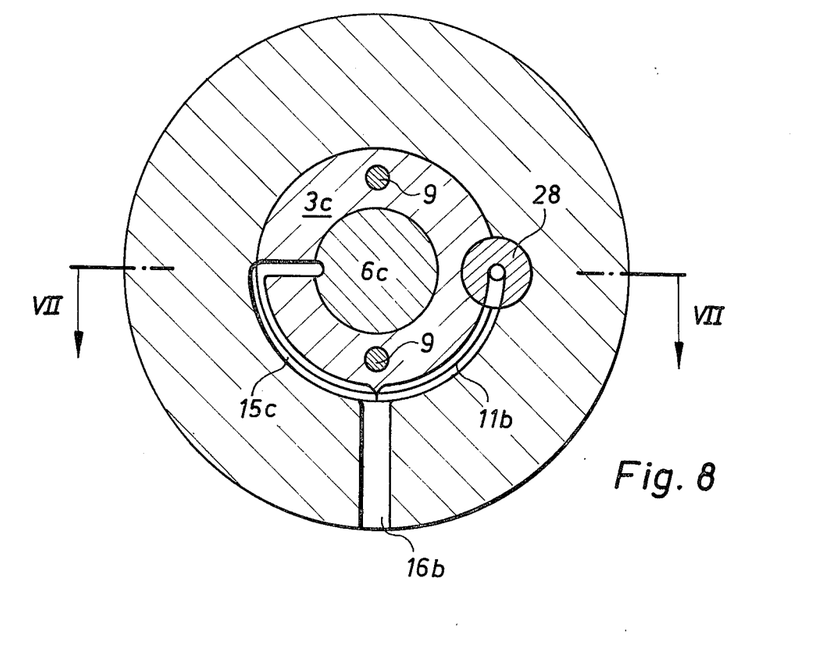
FIG. 8 is a cross-section, taken along the line VIII—VIII of FIG. 7.

In the fourth embodiment, illustrated in FIGS. 7 and 8, a depression for a cardioid-shaped channel 13 is provided on the mandrel 6c, which forms together with the bushing 3c a feed channel 13. The feed channel 10c is formed between two parts of the annular piston 8c, the inner part 30 of which is provided with a depression which is limited by the inner peripheral surface of the outer part 31 of the annular piston 8c. The two parts 30 and 31 are at the peripheral surface thereof, at which they are connected, stepwise formed and at its bottom faces thereof conically outwardly inclined. The feed channel 10c is connected to a telescoping tube 28, the enlarged head of which is arranged between the housing 1c and the bushing 3c and fastened to the housing 1c in any conveninet manner. The outwardly enlarged conical portion 19c of the mandrel 6c is matched with the bottom faces of the annular piston 8c and the outer surface of the convergent conical portion 21c of the mandrel is substantially matched to the inner peripheral surface of the limiting member 18. Material is fed into the feed channels 10c and 13 from an inlet channel 16b (FIG. 8) which communicates, on the one hand, with a distribution channel 11b leading to the upper end of the telescoping tube 28, and, on the other hand, with a distribution channel 15c formed in part at the outer periphery of the bushing 3c and extending with its end portion through this bushing to the mandrel 6c. The outer peripheral surface of the annular piston 8c is guided over a relatively large distance in the inner peripheral surface of the housing 1c.

Instead of the cardioid-shaped depression 13 on the outer peripheral surface of the mandrel 6c, it is also possible to provide a cardioid-shaped channel 10 as shown and described in connection with the first embodiment. In this case the annular piston is bevelled at its bottom face in the other direction and guided on the mandrel, which in this case is to be formed so as to extend with the cylindrical portion thereof into the nozzle member 24, so that the mandrel has between its long cylindrical part and the short cylindrical part 22 shown in FIG. 7 only a short downwardly tapering conical portion 21.

In the fourth embodiment, illustrated in FIGS. 7 and 8, it is also possible to provide on the outer peripheral surface of the annular piston 8c an additional cardioid-shaped depression which at its outer surface is limited by the inner peripheral surface of the cylindrical housing 1c. Each of the three cardioid-shaped channels provided in this case may be connected to a separate extruder for the plastic material and the materials extruded by the respective extruders may differ from each other. Thus tubular strands may be extruded which have three superimposed different layers, which may have different colors and/or different characteristics.

In the following described modifications according to FIGS. 9–11, parts having the same function as in the above-described embodiment are provided with the same reference numerals.

Figure 9:
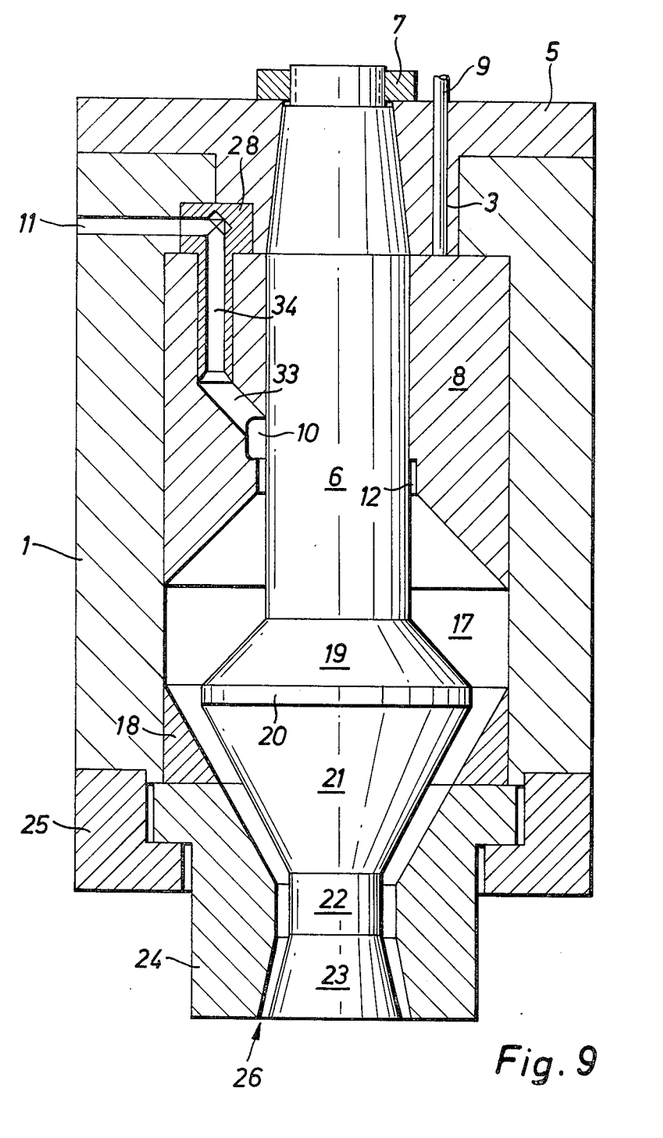
FIG. 9 is an axial cross-section of a fifth embodiment.

The embodiment illustrated in FIG. 9 has a housing 1 in form of a hollow cylinder, and a bushing 3 is inserted into the upper end of the housing 1. The bushing 3 has at its upper end an outwardly extending flange 5 which abuts against the upper end face of the housing 1. The mandrel 6, coaxially extending through the housing 1, has an upper conical portion seated in a corresponding bore in the bushing 3. The upper cylindrical end of the mandrel 6 is provided with an outer screw thread onto which a nut 7 is screwed, so as to hold the mandrel 6 in the bushing 3. An annular piston 8 is axially movable between the housing 1 and the mandrel 6 and the piston is movable in downward direction by a plurality of rods 9, of which only one is illustrated in FIG. 9. A cardioid-shaped feed channel 10 is provided at the inner peripheral surface of the annular piston 8 which distributes the material, fed thereinto through the inlet channel 11, uniformly about the circumference of the mandrel 6, so that the material emanates in form of a tube at the outlet end 12 of the cardioid-shaped channel. The inlet channel 11 is connected to one or a plurality in parallel-arranged extruders, not shown in the drawing.

A material receiving space 17 is arranged below the annular piston, which is shown in FIG. 9 in its uppermost position. The space 17 is arranged between the inner peripheral surface of the housing 1 and the outer peripheral surface of the mandrel 6. The annular space 17 is limited at its lower end by a limiting member 18 of wedge-shaped cross-section and having an inner conical surface. The cylindrical portion of the mandrel 6 is followed in downward direction by an upwardly tapering frustoconical portion 19, a short cylindrical portion 20 of large diameter, a downwardly tapering frustoconical portion 21, a cylindrical portion 22 of small diameter and an upwardly tapering frustoconical portion 23. The upper part of the downwardly tapering frustoconical portion 21 is located in the region of the limiting member 18 and the cone angle of the inner peripheral surface of the limiting member 18 corresponds to the cone angle of the frustoconical part 21 of the mandrel. A nozzle member 21 abuts with its upper face in part against the bottom face of the housing 1 and is held on the latter by a member 25, fixed to the housing 1 in any convenient manner. The inner surface of the nozzle member 24 is substantially matched with the outer peripheral surface of the portions 21–23 of the mandrel 6, while an annular space, provided between the aforementioned mandrel portions and the bushing member 24, gradually decreases toward the outlet end 26 of the aforementioned annular space.

The bottom face of the annular piston 8 is substantially matched with the outer surface of the upwardly tapering frustoconical portion 19 of the mandrel 6. The annular piston 8 is movable in downward direction by a plurality of rods 9, of which only one is shown in FIG. 9, and in upward direction by the material fed under pressure into the annular space 17. In its lowest position, the annular piston 8 is upwardly spaced from the upwardly tapering frustoconical portion 19 of the mandrel. During its downward movement, the annular piston 8 will extrude the material fed into the material receiving space 17 through the outlet end 26 of the annular channel through the nozzle member 24.

The outer peripheral surface of the annular piston 8 abuts against the inner peripheral surface of the cylindrical housing 1. The cardioid-shaped feed channel 10 is formed by a corresponding cutout extending from the inner peripheral surface of the annular piston 8 into the latter and is inwardly limited by the cylindrical peripheral surface of the mandrel 6. The length of the channel 10 remains constant during emptying of the space 17 and therewith the flow resistance of the thermoplastic material passing therethrough remains also constant. The channel 10 is connected to a channel 34 passing through a telescoping tube 28 and through an inclined channel 33 passing through the annular piston 8. The telescoping tube 28 projects in a corresponding bore in the annular piston 8 and is held at its enlarged upper end between the housing 1 and the bushing 3 in stationary position. The channel 34 through the bushing is connected at its upper end with an inlet channel 11 passing through the wall of the housing 1 and the enlarged upper portion of the telescoping tube 28. The annular piston 8 moves during its axial movement relative to the telescoping tube 28.

Figures 10, 11:
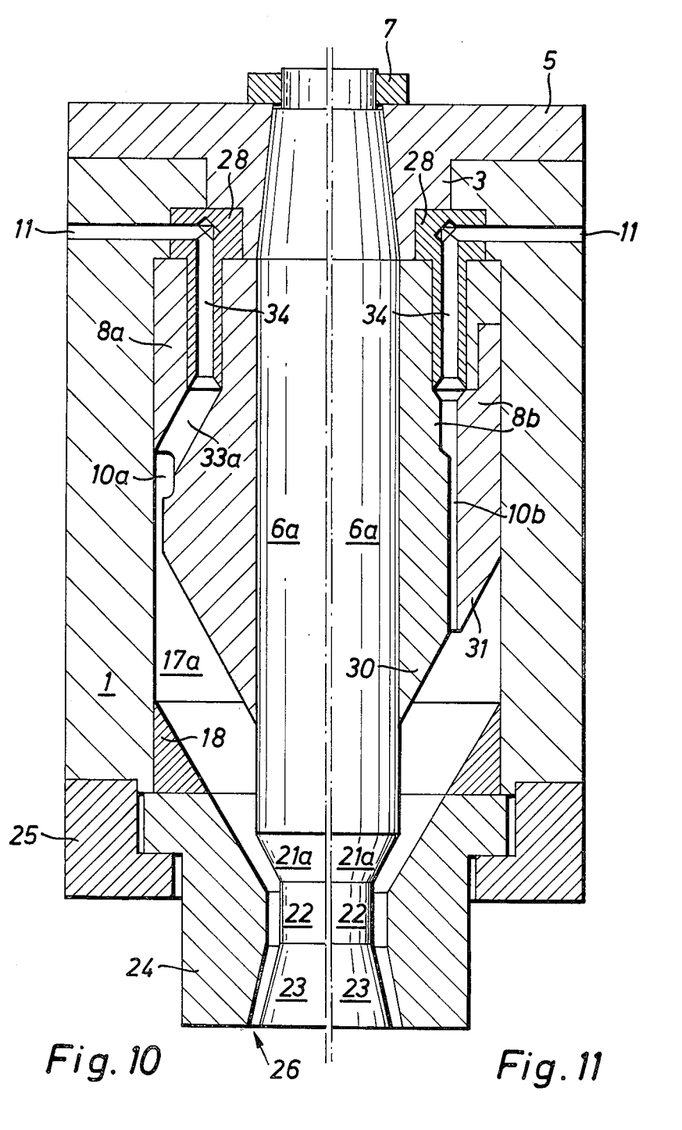
FIG. 10 illustrates half of a seventh embodiment in axial cross-section.
FIG. 11 illustrates half of an eighth embodiment in axial cross-section.

In the embodiment illustrated in FIG. 10, the cardioid-shaped feed channel 10a is provided at the outer peripheral surface of the annular piston 8a and the inclined channels 33a ends also at the outer peripheral surface of the annular piston 8a. The annular piston 8a is, in contradistinction to that shown in FIG. 9, bevelled in the opposite direction, so that the longer portion of the annular piston 8a is located in the region of the cylindrical portion of the mandrel 6a, at the bottom end of which a relatively short downwardly tapering frustoconical portion 21a is provided.

The cardioid-shaped feed channel 10b in the embodiment according to FIG. 11 is formed between two parts of the annular piston 8b, the inner part 30 of which is provided with a cutout and the outer part 31 of which limits with its cylindrical inner surface this cutout. The two parts 30 and 31 are stepwise formed at the sides thereof which are connected to each other and the bottom face of the annular piston 8b is bevelled in the same direction as that of the embodiment shown in FIG. 10. The first channel 10b communicates with the telescoping tube 28, the enlarged head of which is held in stationary position between the housing 1 and the bushing 3. It is also possible to bevel the annular pistons 8, 8a, and 8b respectively shown in FIGS. 9, 10 and 11 in a direction opposite to the direction shown, under corresponding adaption of the respective mandrel and the limiting member 18.

Figure 12:
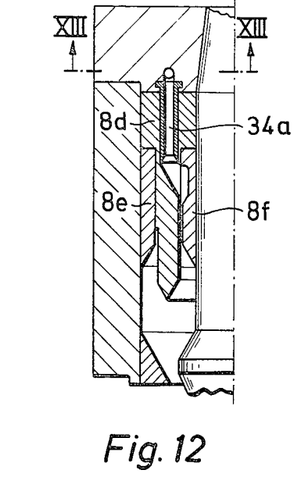
FIG. 12 illustrates half of a ninth embodiment in axial cross-section, taken along the line XII—XII of FIG. 13.
Figure 13:
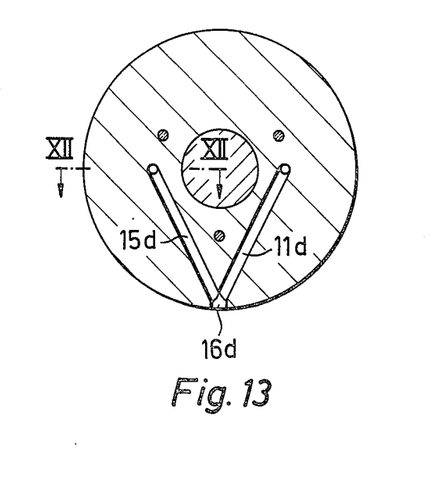
FIG. 13 is a horizontal cross-section, taken along the line XIII—XIII of FIG. 12.

In the modification illustrated in FIGS. 12 and 13 the distribution channels 11d and 15d, which communicate at one end with a common inlet channel 16d, are arranged along the legs of an isosceles triangle and communicate at the end thereof, distant from the inlet channel 16d, with telescoping tubes 34a, which at the upper ends are again stationarily held, so that the annular piston moves during its axial movement relative to the stationarily arranged telescoping tubes 34a. The annular piston may be formed, as shown in FIG. 12, from three parts 8d, 8e and 8f, but depending on the construction of the feed channels therethrough the annular piston may also be formed from a single piece.

Figure 14:
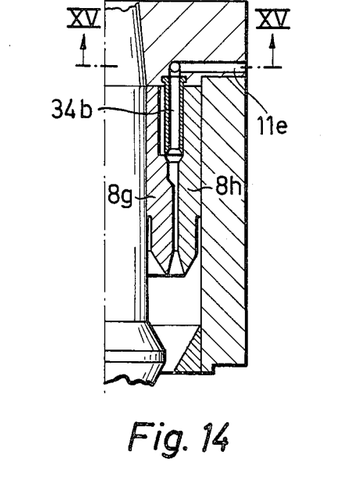
FIG. 14 illustrates half of a 10th embodiment in axial cross-section, taken along the line XIV—XIV of FIG. 15.
Figure 15:
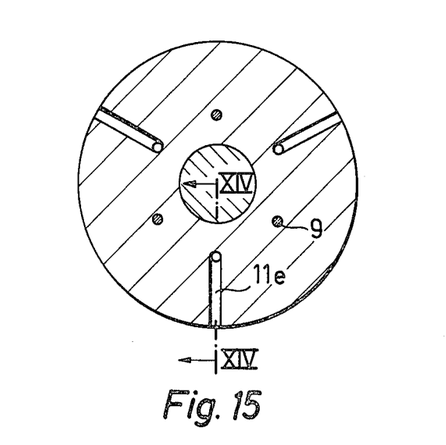
FIG. 15 is a cross-section taken along the line XV—XV of FIG. 14.

In the modification illustrated in FIGS. 14 and 15 the inlet channels 11e extend in radial direction and communicate at the inner ends thereof with three telescoping tubes 34, of which only one is shown in FIG. 14. The telescoping tubes 34b are again held in stationary position so that the annular piston formed by the two annular members 8g and 8h will move, during its movement in axial direction, relative to the stationarily arranged telescoping tubes 34b. The annular piston 8g, 8h may in addition be flowed about at its outer and inner peripheral surface with plastic material so that the plastic material is distributed from each telescoping tube in three concentric material streams. The two-part annular piston, illustrated in FIG. 14, may also be replaced by a piston formed of a single piece.

Figures 16, 17:
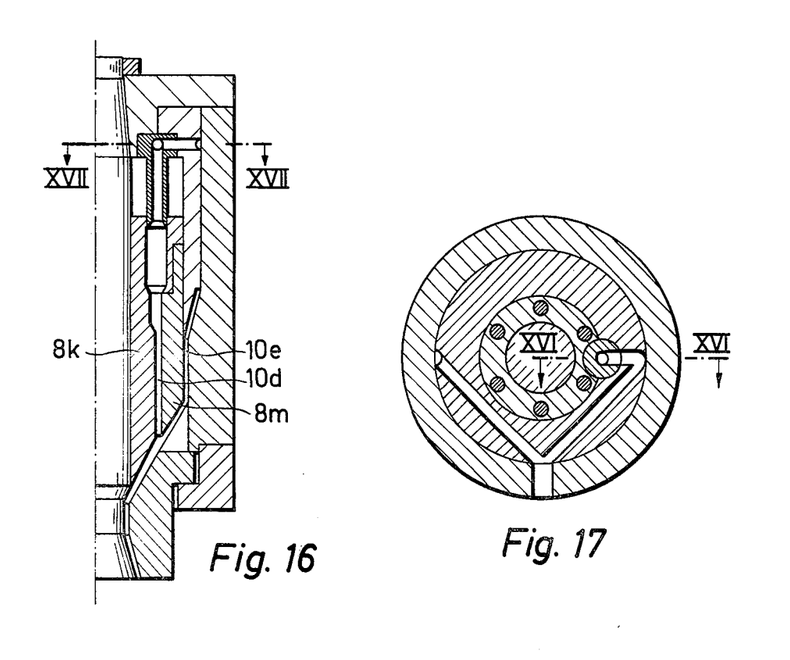
FIG. 16 illustrates half of an 11th embodiment in axial cross-section, taken along the line XVI—XVI of FIG. 17.
FIG. 17 is a cross-section taken along the line XVII—XVII of FIG. 16.

FIGS. 16 and 17 illustrate a further modification for the production of two partial streams which flow downwardly through the feed channels 10d and 10e. These two feed channels are supplied with plastic material through distribution channels as shown in FIG. 17. The two part annular piston 8k and 8m is illustrated in FIG. 16 in its lowermost position.

Figure 18:
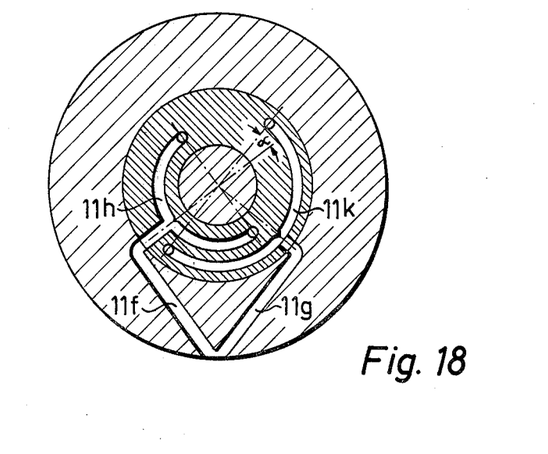
FIG. 18 is a horizontal cross-section through a modified embodiment.

FIG. 18 illustrates a further modification in which the inlet channels 11f and 11g are respectively connected at the inner ends thereof to the centers of semicircular distribution channels 11h and 11k. The distribution channels 11h and 11k have different radii. The ends of the distribution channels communicate with telescoping tubes, not shown in FIG. 18, whereby these telescoping tubes are arranged in pairs diametrically opposite each other. As shown in FIG. 18, the ends of the distribution channels are offset in circumferential direction relative to each other through an angle deviating from a right angle through an acute angle α. In this way the seam regions of the individual streams are likewise offset with respect to each other through this angle α.

Figure 19:
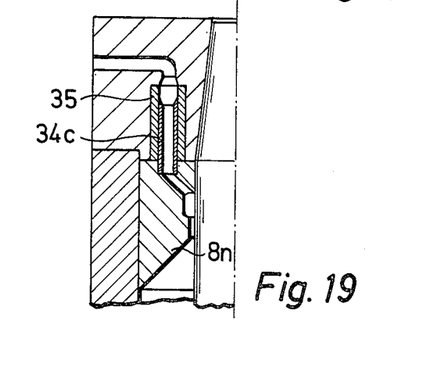
FIG. 19 is a vertical cross-section through half of a 12th embodiment.

FIG. 19 illustrates an alternative arrangement of a telescoping tube 34c, which at its lower end is fixed in any convenient manner to the annular piston 8n and which is movable in a stationarily arranged bushing 35.

Figure 20:
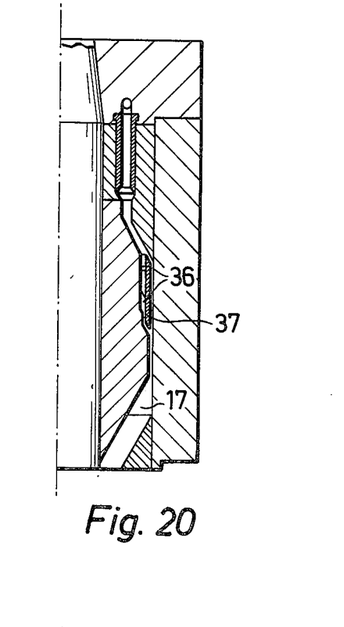
FIG. 20 is a vertical cross-section through half of a 13th embodiment.

FIG. 20 illustrates a further modification in which the plastic material after, being distributed over the periphery of the annular pistion, is divided in two partial streams, before it enters into the material receiving space 17, by means of an intermediate ring 37, connected to the annular piston by a plurality of radially extending webs 36. The intermediate ring 37 will divide the material into two concentric partial streams which, downstream of the intermediate ring, combine again with each other.

Figure 21:
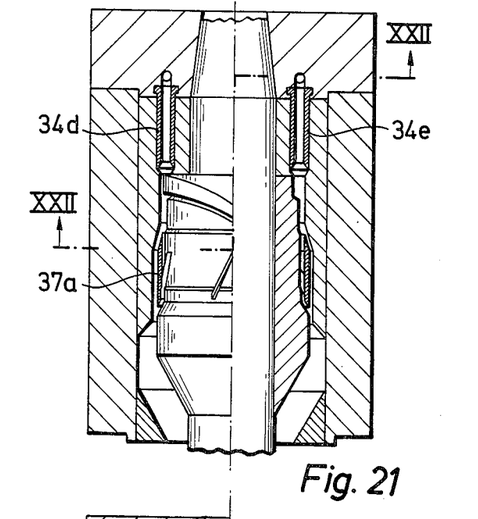
FIG. 21 is a vertical cross-section through a 14th embodiment, taken along the line XXI—XXI of FIG. 22.
Figure 22:
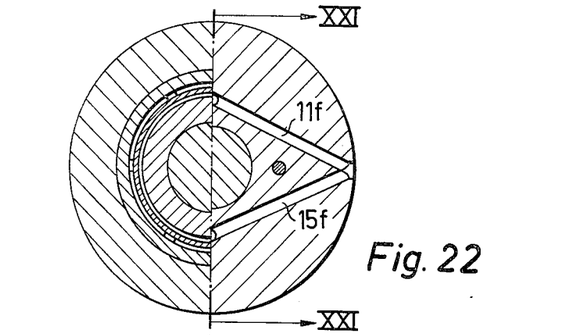
FIG. 22 is a cross-section taken along the line XXII—XXII of FIG. 21.

A similar construction is shown in FIGS. 21 and 22, which illustrate an intermediate ring 37a, two telescoping tubes 34d and 34a, which communicate at the upper ends thereof with distribution channels 11f and 15f. The webs which as shown in FIG. 21 are provided at the inner surface of the intermediate ring 37a may also be provided, if desired, on the outer surface thereof, that is between the annular piston and the intermediate ring so that the latter is vertically movable with the annular piston.

It will be understood that each of the elements described above, or two or more together, may also find a useful application in other types of extrusion press heads for extrusion of tubular strands from plastic material, differing from the types described above.

While the invention has been illustrated and described as embodied in an extrusion press head for the extrusion of a tubular strand of plastic material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

I claim:

1. In an extrusion press head for the extrusion of tubular strands of plastic material, a combination comprising an outer housing; a mandrel extending coaxially through said outer housing and defining therewith an annular space; an annular piston axially movable in said annular space; and at least one feed channel for a plasticized material, said at least one feed channel having an annular outlet end communicating with said annular space below the piston, said annular outlet end having an inner diameter which is greater than the inner diameter of the annular piston so that at least part of said annular piston is located between said outlet end and said mandrel.

2. A combination as defined in claim 1, and including at least one additional feed channel having likewise an annular outlet end and the diameter of the outlet end of said one feed channel and that of said additional feed channel being constructed such that at least part of said annular piston is located between said outlet ends so as to separate such streams of plasticized material flowing through the feed channels into said annular space from each other.

3. A combination as defined in claim 2, wherein said outlet end of one of said feed channels has an inner diameter which is at least equal to the outer diameter of said annular piston.

4. A combination as defined in claim 2, wherein the cross-section of said annular piston, at the end thereof adapted to exert pressure on such material in the annular space, is of triangular configuration.

5. A combination as defined in claim 4, wherein said cross-section has the shape of an isosceles triangle.

6. A combination as defined in claim 4, wherein said feed channels are of cardioid shape, with one of said feed channels constituted by a cutout in said mandrel, and including a bushing between said housing and said mandrel, said bushing being provided on the outer surface thereof with a cutout forming the other of said feed channel.

7. A combination as defined in claim 4, wherein said additional feed channel constitutes an inner feed channel extending about said mandrel, and including a bushing between said housing and said mandrel, an inlet channel having a portion coaxial with said mandrel communicating with said inner feed channel and a plurality of webs extending transversely through said inner feed channel and connecting said mandrel to said bushing, said bushing being formed at the outer peripheral surface thereof with a cutout constituting said one feed channel.

8. A combination as defined in claim 4, wherein said annular piston is provided at least at one side thereof with a cardioid-shaped cutout forming together with part of said extrusion press head, bordering at said one side of said annular piston, one of said feed channels.

9. A combination as defined in claim 2, wherein said annular piston is constituted by two bushing-shaped parts, between which one of said feed channels is formed, said feed channel formed between said two parts being of cardioid shape.

10. A combination as defined in claim 2, and including at least one inlet channel communicating with one of said feed channels, said inlet channel including at least one telescoping tube extending into said annular piston.

11. A combination as defined in claim 10, wherein said at least one inlet channel extends in the region of said piston parallel to the axis of the latter, said telescoping tube extends likewise parallel to said axis of said piston through said inlet channel.

12. A combination as defined in claim 11, wherein said telescoping tube is mounted in fixed position in said housing so as to extend for different lengths into said feed channel during axial movement of said piston.

13. A combination as defined in claim 11, wherein at least one of said feed channels is of cardioid shape, and wherein a portion of said annular piston between said mandrel and said feed channel is shorter in axial direction of said piston than a portion thereof located between said feed channel and said housing.

14. A combination as defined in claim 11, wherein at least one of said feed channels is of cardioid shape, and wherein said cardioid-shaped channel is delimited on one side by said annular piston and at the other side by said mandrel.

15. A combination as defined in claim 11, wherein said inlet channel comprises a stationary bushing extending parallel to the axis of said piston, said telescoping tube extending through said bushing and being fixed at one end thereof to said piston to be moved relative to said bushing during axial movement of said piston.

16. A combination as defined in claim 11, and including an intermediate ring downstream of said outlet end of one of said feed channels for dividing such material passing through said one feed channel into two streams, and a plurality of circumferentially spaced webs securing said intermediate ring to said piston.

17. A combination as defined in claim 11, and including an additional inlet channel including a telescoping tube communicating with said additional feed channel, said one and said additional inlet channel having portions extending along the legs of an ososceles triangle and having at the apex of the triangle a common inlet end.

18. A combination as defined in claim 17, wherein said inlet channels communicate with semicircular distribution channels downstream of said inlet channel, said semicircular distribution channels having respectively different diameters and each having a pair of opposite ends respectively communicating with said telescoping tubes.

19. A combination as defined in claim 18, wherein said opposite ends of said distribution channels are respectively located diametrically opposite each other, and wherein said opposite ends of one of said semicircular distribution channels are circumferentially displaced from the opposite ends of the other semicircular distribution channel.

* * * * *